No. 796,497. PATENTED AUG. 8, 1905.
N. A. CARPING.
CARPENTER'S GAGE FOR SETTING HINGES.
APPLICATION FILED APR. 17, 1905.
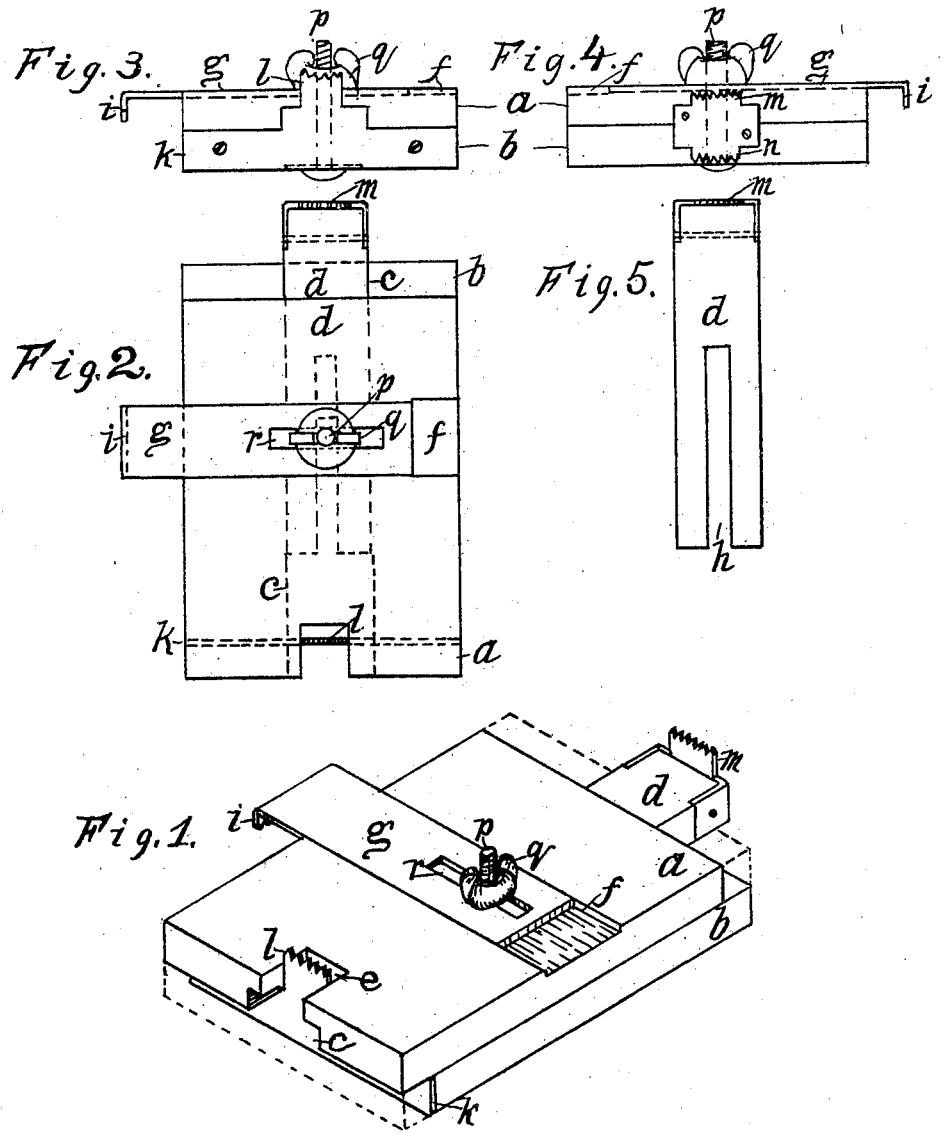
Witnesses.
C. K. Mitchell.
F. C. Sorensen.
Inventor.
Nils A. Carping.
By Wm Zimmerman.
Attorney.

UNITED STATES PATENT OFFICE.

NILS A. CARPING, OF CHICAGO, ILLINOIS.

CARPENTER'S GAGE FOR SETTING HINGES.

No. 796,497.     Specification of Letters Patent.     Patented Aug. 8, 1905.

Application filed April 17, 1905. Serial No. 255,879.

*To all whom it may concern:*

Be it known that I, NILS A. CARPING, a citizen of the United States, residing in Chicago, Cook county, Illinois, have invented certain new and useful Improvements in Carpenters' Gages for Setting Hinges, of which the following is a clear, full, and correct description of the same, reference being had to the accompanying drawings, forming a part hereof, and in which—

Figure 1 shows my said device in perspective. Fig. 2 shows the same as seen on its top. Fig. 3 shows an end view, and Fig. 4 shows the end view opposite to that shown in Fig. 3. Fig. 5 shows in plan view the central reciprocable block which guides the superimposed and main blocks or elements of this device.

Like reference-letters denote like parts throughout.

The object of my invention is to produce a hinge-gage which will be more complete in the range of its capacity to work, and to attain said desirable end I construct my said new device in substantially the following manner, namely:

I take two oblong wooden blocks $a\ b$ of even thickness and cut in each a channel $c$ from end to end of its length and of half of the depth of the block and so that one channel or groove shall be directly over the other of the superimposed blocks, and into said channels I place a sliding block $d$, having a slot $h$, and which is provided at one end with a steel-plate end piece from which project two saws $m$ and $n$, facing in opposite directions and adjusted to a certain depth of cut relatively to the other parts of the gage. Across the piece $a$ is cut a channel $f$, in which slides a steel plate $g$, which is limited in its motion by a slot $r$, in which is a bolt $p$ and set-nut $q$. The outer end of said plate is turned down and provided on its edge with saw-teeth $i$.

To the rear end of the block $b$ is attached a steel plate $k$, which has an arm which projects above the block $a$ through an end notch $e$ in the center of the channel $c$ and center of the block $a$ and projects over the latter, and its upper edge is provided with saw-teeth $l$, set to cut a desired depth beyond the surface of the block $a$.

A bolt $p$ passes through the blocks $a$ and $b$ and through the slot $h$ of the reciprocable block $d$. The said three blocks are fitted to each other, so as to bind all three of them together firmly under the pressure of the nut $q$ and also so that all the parts $a\ b\ d\ g$ will be held firmly to their set places by said nut $q$.

In use each saw is set to its proper place for which it is adapted, and the gage is then reciprocated and held to place, so as to make any saw, as $i\ l\ m\ n$, cut to its proper depth and place. The channels $c$ in each half of the blocks $a$ and $b$ guide the block or saw-carrier $d$, and it in turn guides the blocks $a$ and $b$. The channel $f$ guides the blade or element $g$, and the slot $r$ and bolt $p$ allow setting the saw $i$. The block $d$ may have its saws $m$ and $n$ set in and out from $a$ and $b$, respectively, each for itself, more or less, as shown.

In this device are combined four different saws for cutting the outlines of the wood to be cut away for setting ordinary door-hinges instead of merely making a mark or scribe to which the wood must be cut away for such work.

What I claim is—

Superimposed relatively adjustable longitudinally-grooved blocks, a longitudinally-adjustable block in said grooves, a transversely-adjustable element on the face of one of said blocks, a saw at its outer end, an oppositely-facing saw on said groove-guided block, and a saw at one end of one of said grooved blocks, said parts relatively adjustable, and a bolt to lock said parts to place.

NILS A. CARPING.

Witnesses:
   WM. ZIMMERMAN,
   THOMAS J. NEWBERRY.